United States Patent Office 3,562,346
Patented Feb. 9, 1971

3,562,346
PROCESS FOR DEHYDROGENATION, DEHYDRO-
CYCLIZATION AND HYDRODEALKYLATION OF
HYDROCARBONS
Viktor Sergeevich Smirnov, Kutuzovsky prospekt 26, kv.
555; Vladimir Mikhailovich Gryaznov, Leninskie Gory
MGU zona L, kv. 11; Alexandr Petrovich Mischenko,
Khersonskaya ulitsa 7, korpus 4, kv. 115; and Antonina
Alexandrovna Rodina, Ljusinovskaya ulitsa 53/12, kv.
53, all of Moscow, U.S.S.R.
No Drawing. Filed Mar. 8, 1968, Ser. No. 711,535
Claims priority, application U.S.S.R., Mar. 8, 1967,
1,139,894; Mar. 9, 1967, 1,140,205; Apr. 28, 1967,
1,157,508, 1,157,509, 1,157,510
Int. Cl. B01j *11/08;* C07c *5/18;* C10g *35/06*
U.S. Cl. 260—673.5                                22 Claims

ABSTRACT OF THE DISCLOSURE

Palladium alloyed with copper, gold, boron, or a Group VIII metal is employed for hydrodealkylation and for dehydrogenation to produce aromatics, diolefins, and mono-olefins.

This invention relates to processing of petroleum and natural gas hydrocarbons and, more particularly, to processes for the dehydrogenation, dehydrocyclization and hydrodealkylation of $C_2$ to $C_{20}$ hydrocarbons. The present invention may find application for the manufacture of monomers to be used in the synthetic polymer industry, for the production of pharmaceuticals and also in conjunction with the manufacture of semiconductors.

Dehydrogenation, dehydrocyclization and hydrodealkylation of hydrocarbons with a view to obtaining dienes and aromatic hydrocarbons is carried out over diverse catalysts at a temperature of 400 to 600° C. For example, the dehydrogenation of isoamylene to isoprene is carried out over a nickel calcium phosphate catalyst, while butane and isopentane dehydrogenation are effected over oxide catalysts, and the production of divinyl from butene-1 involves dehydrogenation over various phosphate catalysts. The process of catalytic dehydrocyclization calls for the employment of platinum- and palladium-alumina catalysts or mixed alumina-chromia catalysts.

High-temperature conditions of carrying out the above processes result in a substantial decomposition of hydrocarbon feeds, as well as in coking of the catalysts used, so that it is imperative to resort to periodic catalyst regeneration. Moreover, the employment of an oxide catalyst is impracticable for the single-stage production of benzene from $C_6$ and higher alkanes. It is a further disadvantage of oxide, mixed or carrier supported metal catalysts that none of them is suitable for use as a non-porous membrane which is selectively permeable to hydrogen.

It is an object of the present invention to provide catalysts for carrying out the process of dehydrogenating olefins to dienes at lower temperatures, involving reduced hydrocarbon feed composition and catalyst coking.

It is another object of the present invention to enhance the yield of the produced compounds, e.g., benzene dienes, etc.

It is a further object of the present invention to provide a catalyst suitable for the employment of $C_6$ and higher alkanes as a hydrocarbon feed for the direct production of benzene.

It is a still further object of the present invention to provide catalysts, which apart from being useful in the processes of hydrocarbon dehydrogenation, dehydrocyclization and hydrodealkylation, are selectively permeable to hydrogen, thereby stimulating the dehydrogenation process as a result of hydrogen discharge from the dehydrogenation zone.

These objects are accomplished by a process for the catalytic dehydrogenation, dehydrocyclization and hydrodealkylation of $C_2$ to $C_{20}$ hydrocarbons fed either in the pure state or in a stream of an inert gas, such as nitrogen, helium, argon, or hydrogen, the process being carried out at a temperature of 150 to 600° and at atmospheric or superatmospheric pressure. According to the present invention, the catalysts which are used consist fo palladium alloys containing at least one component selected from the elements of Group VIII of the periodic system, or copper, silver, gold or boron.

The catalysts may be employed in the form of blacks, powders, gauze, foil or impermeable membranes that are selectively permeable to hydrogen only. Palladium alloys may be preactivated by subjecting them to heat treatment in an atmosphere that is inert in relation to the catalysts, viz, in nitrogen, helium, argon, or hydrogen, at a temperature higher than that of the process for hydrocarbon dehydrogenation, dehydrocyclization and hydrodealkylation.

The employment of the aforementioned catalysts renders possible the suppression of by-product formation in the course of hydrocarbon dehydrogenation to yield dienes and of dehydrocyclization to yield aromatic hydrocarbons and, therefore, facilitates the subsequent separation of the reaction products.

The present catalysts retain their activity for a prolonged period of operation, e.g., for a period of 200 hours.

The present process is instrumental in producing benzene directly by processing higher than $C_6$ alkanes, since the alkylaromatic hydrocarbons obtained as a result of dehydrocyclization undergo dealkylation.

For a better understanding of the present invention, the following examples are presented by way of illustration.

EXAMPLE 1

The dehydrogenation of 2-methylbutene-1 to yield isoprene is carried out in the 150 to 370° C. temperature range over foils made from palladium alloyed with nickel, rhodium, ruthenium, silver or boron, the alloys being of a variable composition, specified here and in subsequent examples in wt. percent. The reaction products are identified by the chromatographic technique. Listed in Table 1 are isoprene yields in vol. percent based on the hydrocarbon feed for various catalyst used.

TABLE 1.—DEHYDROGENATION OF 2-METHYLBUTENE-1

| Catalyst: | ° C. | | | | | |
|---|---|---|---|---|---|---|
| | 150 | 200 | 250 | 280 | 300 | 370 |
| Pd(94.5)/Ni(5.5) | 6 | 40 | 74 | 81 | 79 | 69 |
| Pd(90))/Rh(10) | 12 | 51 | 76.5 | 79 | 76 | 18 |
| Pd(80)/Ag(20) | 0.1 | 6 | 13.5 | 20 | 23 | 15 |
| Pd(90)/Ru(10) | 3 | 16 | 31 | 34 | 30 | 10 |
| Pd(99.3)/B(0.7) | | 2 | 6 | 9 | 10 | 12 |

At temperature below 370° C., the reaction products consist solely of unreacted 2-methylbutene-1 and isoprene and can, therefore, be readily separated. At 370° C., there commences the decomposition of the hydrocarbon feed and the resultant formation of butene, propylene, ethylene and methane, so that it is inexpedient to carry out the process at temperatures in excess of 370° C.

When use is made of palladium alloys containing different proportions of the second component, the results are similar to those indicated in Table 1.

Hence, it is practicable to obtain as much as 81% of diene from olefin in a single pass and under relatively moderate conditions (280° C.). By way of comparison, mention may be made of the fact that with phosphate catalysts the yield of diene reaches 72% only at a temperature of 490° C.

EXAMPLE 2

The dehydrogenation of isopentane to yield isopentene and isoprene is effected over foils made from palladium alloyed with nickel, rhodium, ruthenium, silver or boron and at a temperature of from 450 to 600° C. Table 2 illustrates the temperature dependence of amylene and isoprene yields over palladium-nickel and palladium-rhodium catalysts.

At 600° C., the hydrocarbon feed undergoes decomposition to the extent of 6–9%, but at temperatures below 600° C. there occurs no catalyst poisoning with the reaction products.

TABLE 2.—DEHYDROGENATION OF ISOPENTANE

| | ° C. catalyst | | | | | | | |
|---|---|---|---|---|---|---|---|---|
| | 450 | | 500 | | 550 | | 600 | |
| | isopentene | isoprene | isopentene | isoprene | isopentene | isoprene | isopentene | isoprene |
| Pd(94.5)/Ni(5.5) | 1 | 2.5 | 3 | 7.5 | 10 | 18 | 1.5 | 20 |
| Pd(90)/Rh(10) | 2.5 | 3 | 3 | 6 | 2 | 12 | 5.5 | 23.5 |

EXAMPLE 3

The dehydrocyclization of n-hexane to yield benzene is carried out at a temperature of from 400 to 600° C. over membranes made from palladium alloyed with nickel, rhodium, ruthenium, silver or other metals. The yield of benzene grows with increasing temperatures, as it follows from Table 3, which shows the temperature dependence of the catalytic activity of palladium-nickel and palladium-rhodium alloys.

TABLE 3.—DEHYDROCYCLIZATION OF n-HEXANE (BENZENE YIELD, VOLUME PERCENT)

| | ° C. catalyst | | | | |
|---|---|---|---|---|---|
| | 400 | 450 | 500 | 550 | 600 |
| Pd(94.5)/Ni(5.5) | 2 | 14 | 68 | 91 | 100 |
| Pd(90)/Rh(10) | 3.5 | 50 | 82.5 | 92 | 94 |

At a temperature of 600° C. and with the palladium-rhodium catalyst, there takes place the formation of methane to the extent of 6%. It follows from the data listed in Table 3 that the dehydrocyclization of n-hexane over membranes made from the palladium-nickel alloy results in its being completely converted to benzene at a temperature of 570–600° C.

EXAMPLE 4

The dehydrocyclization of n-heptane is carried out at a temperature of from 450 to 550° C. over foils made from palladium-nickel and palladium-rhodium alloys without heat treatment and after heat treatment in the 450–550° C. temperature range. Heat treating the catalyst is accomplished by maintaining it at 700° C. for 20 minutes in an argon stream and thereafter cooling it down rapidly during 1–5 minutes to 400° C. The above heat treatment enhances the activity of the catalyst, as shown in Table 4.

EXAMPLE 5

The dehydrocyclization of n-octane is effected over a palladium-nickel alloy (Ni content, 5.5 wt. percent), the principal reaction products being benzene and o-xylene. Other xylene isomers are present in significant amounts in the reaction mixture, whilst the yield of ethylbenzene does not exceed 5%. The reaction also involves the formation of toluene. For example, the process carried out at 408° C. yields 18% benzene, 6% toluene, 18% o-xylene, 3% ethylbenzene, and 1% of m- and p-xylenes, so that the overall yield of aromatics equals 46%.

The dehydrocyclization of n-decane over the same catalyst and at a temperature of 553° C. yields as much as 28.9% benzene and 7.7% toluene.

In the dehydrocyclization of octane and decane the employment of the alloys of palladium containing other proportions of nickel or alloys of palladium with rhodium, ruthenium and silver produces the results similar to those disclosed hereinabove.

EXAMPLE 6

The hydrodealkylation of toluene to yield benzene is carried out over foils made from palladium alloyed with nickel, rhodium, ruthenium or silver in the temperature range of from 500 to 600° C. For example, the hydrodealkylation of toluene over palladium-nickel (Ni content, 5.5 wt. percent) and palladium-rhodium (Rh content, 10 wt. percent) at a temperature of 500° C. yields 1% and 3% of benzene, respectively, whereas at a temperature of 600° C. the yield of benzene rises up to 14% over the platinum-nickel catalyst and up to 17% over the palladium-rhodium catalyst. The employment of the above catalysts subjected to preliminary heat treatment, in accordance with the procedure disclosed in Example 4, results in increasing substantially the yield of the product compound, i.e., benzene. Thus, the conversion of toluene to benzene over the heat treated palladium-nickel catalyst equals 7.5% at 500° C. and 65% at 600° C., so that the yields are nearly 5 times greater than those obtained with the untreated catalyst. Heat treatment exerts a similar effect on the palladium-rhodium catalyst. In this case, the yield of benzene equals 11% at 500° C. and 68% at 600° C.

Methane, benzene and toluene are the sole constituents of the reaction mixture and can, therefore, be readily separated.

EXAMPLE 7

The hydrodealkylation of ethylbenzene carried out in

TABLE 4.—DEHYDROCYCLIZATION OF n-HEPTANE

| | Without heat treatment, ° C. | | | | | | After heat treatment, ° C. | | |
|---|---|---|---|---|---|---|---|---|---|
| | 450 | | 500 | | 550 | | 450 | 500 | 550 |
| Catalyst | Benzene | Toluene | Benzene | Toluene | Benzene, | Toluene | Benzene, toluene | Benzene, toluene | Benzene, toluene |
| Pd(94.5)/Ni(5.5) | 1.5 | 10.3 | 5.2 | 21 | 15.1 | 49.8 | 11.8, 13.5 | 15.9, 38.9 | 19, 46 |
| Pd(90)/Rh(10) | 20.3 | 12.9 | 27 | 32 | 23.6 | 45.9 | 29.9, 20.5 | 36.2, 30.6 | 40, 42 |

Benzene and toluene are the principal reaction products, the overall yield of aromatic hydrocarbons being as high as 82.0%, of which amount about half is benzene, when recourse is had to the heat-treated palladium-rhodium catalyst. The catalyst activity remains constant for a considerable period of time, viz, for 200 hours of catalyst service.

The employment of other alloys as catalysts gives similar results.

the 500–600° C. temperature range over foils made from palladium alloyed with nickel or rhodium yields benzene and toluene. When use is made of the palladium-nickel catalyst (Ni content, 5.5 wt. percent), the yield at a reaction temperature of 500° C. is 1% benzene and 6% toluene, whereas at a temperature of 600° C. the yield increases to 15% and 19%, respectively. With the palladium-rhodium catalyst (Rh content, 10 wt. percent), the yield of dealkylation products at 500° C. equals 0.5% benzene and 3.1% toluene; at a reaction temperature of 600° C., the yield will be up to 7.8% benzene and up to 16.5% toluene.

We claim:
1. A process for the selective manufacture of hydrocarbons, including olefins, dienes and aromatics, which comprises passing a vaporized hydrocarbon feedstock, or a vaporized hydrocarbon feedstock diluted in a stream of an inert gas at a temperature of 150 to 600° C. over a catalyst which is palladium alloyed with at least one member of the group consisting of the other Group VIII metals and copper, gold, and boron.
2. A process according to claim 1, wherein $C_2$–$C_{20}$ olefins are subjected to dehydrogenation.
3. A process according to claim 1, wherein $C_5$–$C_{20}$ paraffins are subjected to dehydrocyclization.
4. A process according to claim 1, wherein alkylaromatic hydrocarbons are subjected to hydrodealkylation.
5. A process according to claim 1, wherein said catalyst is in the form of a non-porous membrane which is selectively permeable to hydrogen only.
6. A process according to claim 1, wherein the hydrogen produced by the reaction is withdrawn through said membrane catalyst.
7. A process according to claim 2, wherein the hydrogen produced by the reaction is withdrawn through said membrane catalyst.
8. A process according to claim 3, wherein the hydrogen produced by the reaction is withdrawn through said membrane catalyst.
9. A process according to claim 1, wherein the hydrogen required for hydrodealkylation is supplied via said membrane catalyst.
10. A process according to claim 4, wherein the hydrogen required for hydrodealkylation is supplied via said membrane catalyst.
11. A process according to claim 5, wherein the hydrogen required for dehydrodealkylation is supplied via said membrane catalyst.
12. A process according to claim 1, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
13. A process according to claim 2, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
14. A process according to claim 3, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
15. A process according to claim 4, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
16. A process according to claim 5, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
17. A process according to claim 6, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
18. A process according to claim 7, wherein said catalyst is subjected to a pre-treatment comprising maintaining said catalyst at a temperature higher than the reaction temperature in an atmosphere of a gas which is inert towards said catalyst, followed by rapidly cooling said catalyst to the reaction temperature.
19. A process according to claim 8, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
20. A process according to claim 9, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
21. A process according to claim 10, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.
22. A process according to claim 11, wherein said catalyst is subjected to a pre-treatment comprising maintaining said catalyst at a temperature higher than the reaction temperature in an atmosphere of a gas which is inert to said catalyst, followed by rapidly cooling said catalyst to the reaction temperature.

References Cited

UNITED STATES PATENTS

| | | | |
|---|---|---|---|
| 3,254,956 | 6/1966 | Hunter | 23—212 |
| 3,264,207 | 8/1966 | Pfefferle | 208—65 |
| 3,488,150 | 1/1970 | Kabisch et al. | 23—207 |
| 3,198,604 | 8/1965 | Pfefferle | 23—212 |
| 3,251,652 | 5/1962 | Pfefferle | 23—213 |
| 3,290,406 | 12/1966 | Pfefferle | 260—683.3 |
| 3,113,931 | 12/1963 | Voltz | 252—442 |
| 2,397,715 | 4/1946 | Weizmann | 260—668 |
| 3,450,500 | 6/1969 | Setzer et al. | 23—212 |

FOREIGN PATENTS

| | | | |
|---|---|---|---|
| 131,710 | 3/1949 | Australia | 260—673.5 |

DELBERT E. GANTZ, Primary Examiner

G. E. SCHMITKONS, Assistant Examiner

U.S. Cl. X.R.

208—138; 252—472; 260—672, 680, 683.3